United States Patent [19]
Smith et al.

[11] Patent Number: 5,672,851
[45] Date of Patent: Sep. 30, 1997

[54] GAUGE HAVING VERTICALLY SUSPENDED MAINSPRING

[76] Inventors: Rodney E. Smith, Rte. 3, Box 268A, Quitman, Miss. 39355; Donald Ivy, P.O. Box 212, Waynesburo, Miss. 39367

[21] Appl. No.: 205,290

[22] Filed: Mar. 1, 1994

[51] Int. Cl.⁶ .............. G01G 3/00; G01G 23/26; F16F 1/06
[52] U.S. Cl. .............. 177/225; 248/624; 267/166; 267/177; 177/230; 177/231
[58] Field of Search .............. 177/225, 230, 177/231, 226, 227, 228, 232, 233, 234; 267/166, 170, 177; 248/624

[56] References Cited

U.S. PATENT DOCUMENTS

| | | | |
|---|---|---|---|
| 444,093 | 1/1891 | Chatillon | 177/233 |
| 1,249,927 | 12/1917 | Dunn | 177/226 |
| 2,507,806 | 5/1950 | Mortimer | 248/624 |
| 3,469,645 | 9/1969 | Provi et al. | 177/174 |
| 3,666,031 | 5/1972 | Provi et al. | 177/174 |
| 3,838,744 | 10/1974 | Tanji et al. | 177/177 |
| 3,850,257 | 11/1974 | Teraoka | 177/226 |
| 3,853,191 | 12/1974 | Yamagiwa | 177/210 |
| 3,856,098 | 12/1974 | Kuhle | 177/226 |
| 3,927,726 | 12/1975 | Hanado et al. | 177/213 |
| 3,967,690 | 7/1976 | Northcutt | 177/25.11 |
| 4,082,153 | 4/1978 | Provi | 177/177 |

FOREIGN PATENT DOCUMENTS

| | | | |
|---|---|---|---|
| 2394070 | 2/1979 | France | 177/225 |
| 0258466 | 7/1988 | Germany | 177/225 |

OTHER PUBLICATIONS

Hansen, Patent Specification (942174), England, Nov. 1963.

*Primary Examiner*—Michael L. Gellner
*Assistant Examiner*—Randy W. Gibson
*Attorney, Agent, or Firm*—Michael J. Kline; Carol I. Bordas

[57] ABSTRACT

An improved gauge, such as a floor scale. The gauge includes a vertically suspended mainspring having a bracket for hanging and providing support to the mainspring.

25 Claims, 7 Drawing Sheets

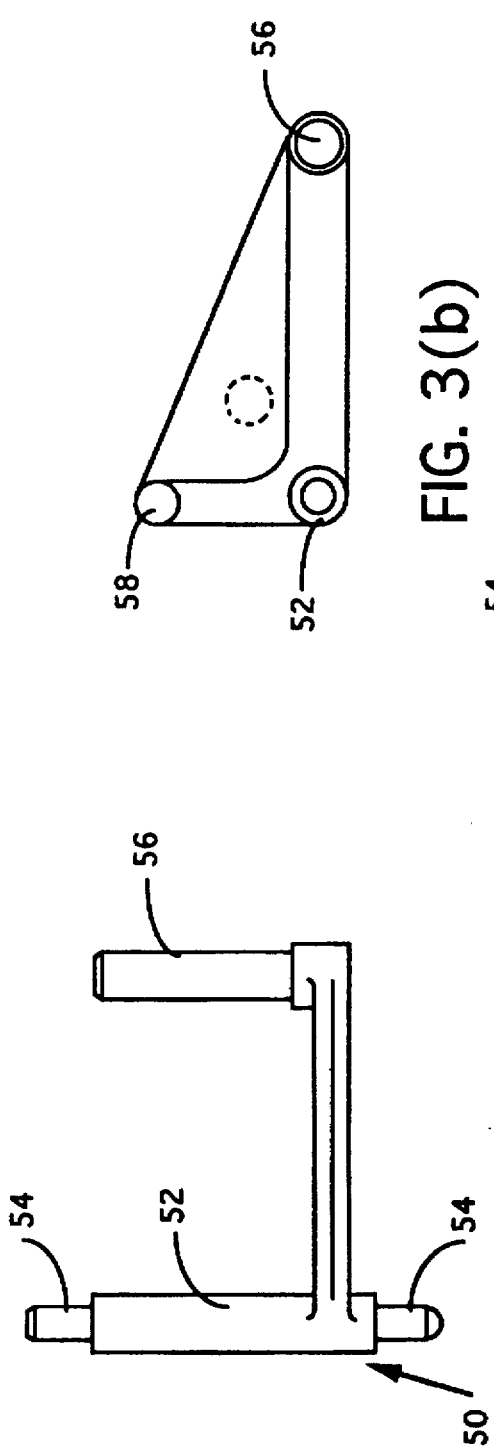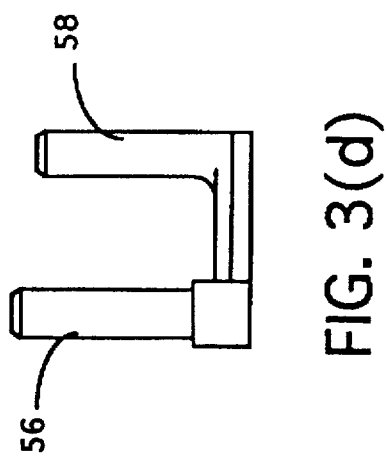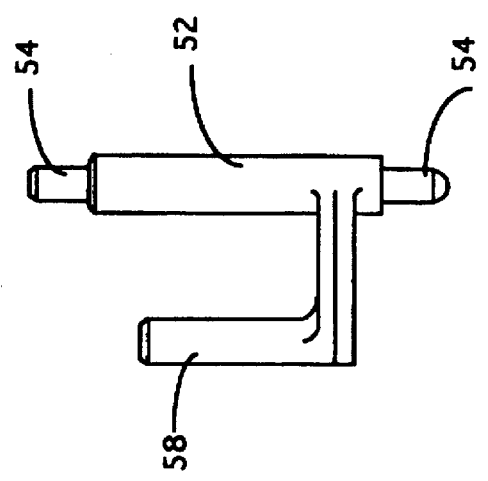
FIG. 3(a)  FIG. 3(b)  FIG. 3(c)  FIG. 3(d)

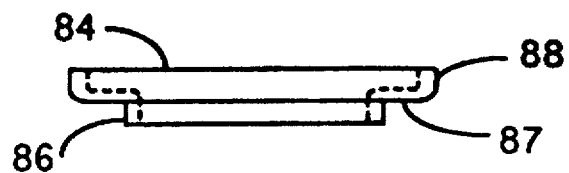
FIG. 5a
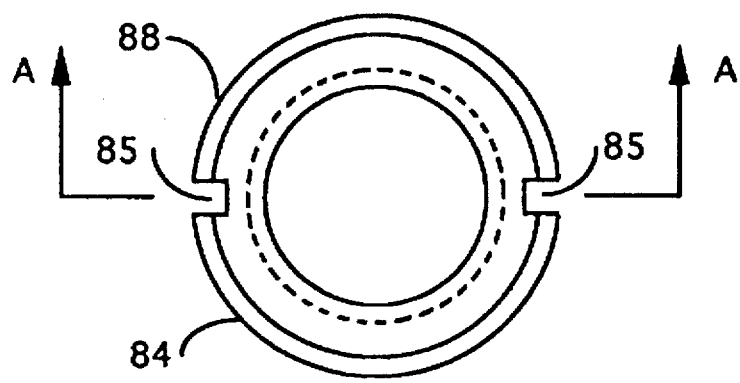
FIG. 5b
FIG. 5c  SECTION A-A 5,672,851

1

GAUGE HAVING VERTICALLY SUSPENDED MAINSPRING

FIELD OF THE INVENTION

The present invention relates to gauges, and more particularly to floor scales having a vertically suspended mainspring.

BACKGROUND OF THE INVENTION

Floor scales having spring-based measuring mechanisms are well-known, and generally include a housing having an upper weighing surface on which a person may stand to assess his or her weight. Such scales may be of the digital type, such as illustrated in U.S. Pat. Nos. 4,082,153 and 3,927,726, or may be of the dial and indicator needle type, as illustrated in U.S. Pat. Nos. 3,469,645 and 3,666,031. In the case of a digital type scale, a dial having a single code track cooperates with a pulse generator to produce a series of pulses as the dial moves in response to the application of weight to the scale, the number of pulses produced being proportional to the applied weight. In the dial and indicator needle type of scale, a dial indicator having a series of numerals and striations, generally corresponding to one pound increments, is used. Such indicators also generally include a needle which rotates and responds to a weight being applied to the scale measuring surface. Alternatively, the dial may rotate and the needle may be stationary.

In both types of scales, the indicator is typically driven by a rack and pinion mechanism as illustrated in FIG. 1. Referring to the prior art scale of FIG. 1, a pointer 100 can be rotated proportionally to applied human bodyweight. In a usual manner, a pinion 102 is attached to the shaft of the pointer 100. A rack 122 engages the pinion 102. The rack 122 is biased by a spring 121 attached to one end thereof in one direction. The other end of the rack 122 is pivoted on a rocking frame 126 with a weighing pin 127. The weighing pin is carried upwardly by the upper surface of bent portions 124a of a pair of long links 124, which form a balancing link mechanism together with a pair of short links 123. Thus, a resistance to inclination of the rocking frame 126 is provided.

In weighing operation, a main weighing spring 125 is expanded proportionally to a distance by which the balancing link mechanism lowers. The upper surface of the bent portions 124a of the long links 124 is lowered in proportion to the expansion of the spring 125. This causes the rocking frame 126 to be inclined by the rack spring 121 to the extent that a balance is reestablished, i.e., until the weighing pin 127 again contacts the lowered end 124a of the links 124. This inclination of the rocking frame results in a movement of the rack 122 by the spring 121 to the right side (as viewed in FIG. 1). This movement causes the pinion 102 to be rotated. Thus, the pointer 100 (or dial) is deflected to an angular position proportional to the applied weight.

One of the problems with the aforedescribed prior art device is the difficulty of assembly of the mainspring and the degree of "slop" inherently built into the balancing link mechanism and mainspring. The links 123 and 124 are, by design, given some "play" such that it is not critical that a person stand in precisely the same location on the scale each time in order to receive a weight. The mainspring 125 of the prior art is supported on a single vertical shaft or pin 128 which also is, by design, given a fair amount of free "play," causing the post 128 to shift, tilting to one side, resulting in the mainspring not hanging completely vertically, at true center, and losing linearity of extension. This results in a

2 scale that is not as accurate, reliable, and as reproducible as it might otherwise be, and may also result in the commonly experienced "wavering" of the indicator upon application of weight. Other problems of the prior art attributable to mainspring suspension include inconsistency in the scale returning to "zero," and lack of accuracy over the full weighing range. Also, the single vertical shaft of the prior art requires a scale with greater height, whereas the trend is to floor scales with a thinner profile.

Accordingly, an advance in the art could be realized if an improved mainspring support for a gauge or floor scale could be developed.

SUMMARY OF THE INVENTION

The present invention satisfies the aforedescribed needs by providing a gauge comprising a vertically supported mainspring suspended from a bracket, the bracket preferably being supported by the base of the gauge at two or more points. The bracket includes an opening through which the mainspring may pass, and the mainspring is vertically suspended on the bracket by a hanger supported by the bracket. The bracket and vertical suspension of the mainspring allows for easier assembly of the scale, greater accuracy, repeatability, and less waiver of the indicator than prior art scales.

These and other features of the preferred embodiments of the invention will become more readily apparent as the following detailed description proceeds, particularly with reference to the figures included herewith.

BRIEF DESCRIPTION OF THE DRAWINGS

FIG. 3a is a top plan view of a preferred rocker for use with the present invention.

FIG. 3b is an elevational view of the rocker of FIG. 3a.

FIG. 3c is a left side elevational view of the rocker of FIG. 3a.

FIG. 3d is a right side elevational view of the rocker of FIG. 3a.

FIG. 5a is an elevational view of a circular ring of the present invention.

FIG. 5b is a plan view of the circular ring of FIG. 5a.

FIG. 5c is a cross-sectional view of the circular ring of FIG. 5b taken along the lines AA.

FIG. 8b is a top plan view of the noseplate of FIG. 8a.

FIG. 8c is a right side elevation view of the noseplate of FIG. 8a.

DETAILED DESCRIPTION OF THE PREFERRED EMBODIMENTS

Figure 2:
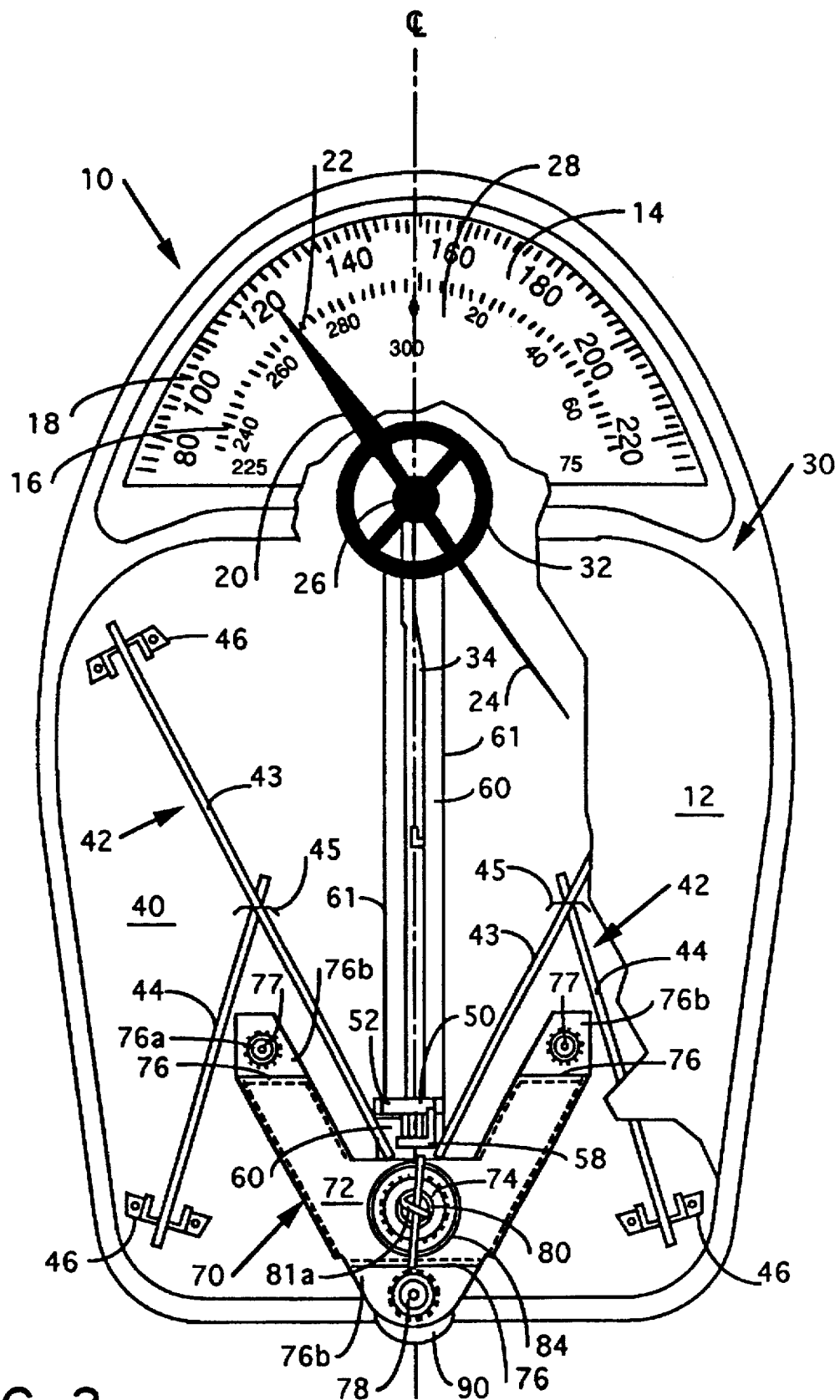
FIG. 2 is a top plan view, partially broken away, of a preferred embodiment of the invention.

Referring now to FIG. 2, there is illustrated an improved gauge, which may comprise a floor scale, generally 10, having a platform 12 upon which a user of the device may stand in order to measure his or her weight. The scale further includes a dial 14, such as disclosed in commonly owned U.S. patent application Ser. No. 08/113,166, which has issued as U.S. Pat. No. 5,452,680 and which dial in this case is semicircular, having an inner and outer row of numbers 16 and 18, respectively. These numbers are, as illustrated, separated by striations corresponding to a unit of measure, such as pounds. Alternative dials and readouts, including circular or digital could also be used.

As illustrated in the embodiment of FIG. 2, one row of numbers forms a continuous progression of measurements with the other row of numbers. For example, the dial indication for zero appears on the inner row of numbers 90° along the arc comprising the semi-circular inner row of numbers. These numbers progress to "75" along the inner row of numbers, at which point the outer row of numbers continues with "75 to "225." The inner row of numbers continues from "225" to "300."

FIG. 2 illustrates the dial 14 with the housing partially broken away to reveal the indicator 20, which may comprise a dual needle having a long end 22 and a short end 24 as illustrated. The long end 22 has a length corresponding to the outer row of numbers 18 and the short end 24 has a length corresponding to the inner row of numbers 16. Alternatively, a single needle and circular dial, a stationary needle and rotating dial, or a digital readout may be used.

Preferably, the needle 20 is rotatably mounted on a spring mechanism at an axis point 26 and the long end 22 and the short end 24 are disposed 180° relative to each other as illustrated.

In operation, as an external stimulus is placed on the gauge, such as, in the case of a scale, a person standing on the platform 12, the needle 20 displaces from the rest or zero position and begins to rotate, for example, in a clockwise direction, until it comes to rest at an indicator position. Generally, only one end, 22 or 24, of the dual needle 20 will be visible through a window or lens 28 in the scale, except in the situation where the individual's weight exactly corresponds with, in this embodiment, a 75-pound or 225-pound reading, wherein both ends of the needle will be visible and the reading may be made from either side of the dial. Depending on the weight of the individual, as the needle rotates, one end of the needle 20 will be hidden from view by a portion of the scale housing, generally 30. Of course, the needle is free to rotate 360° with the scale 10. In order for this to be achieved it is necessary for there to be sufficient clearance for both the long end 22 and short end 24 of the needle 20 to rotate within the scale 10.

In a most highly preferred embodiment of the invention, the outer row of numbers 18 is a different color from the inner row of numbers 16 and the two ends of the needle are of a color corresponding to the respective row of numbers for which that needle end is adapted to indicate a reading. For example, if the inner row of numbers 16 is red, the short end 24 of the needle 20 is also preferably red. If the outer row of numbers is black, the long end 22 of the needle 20 is also preferably black. Other variations are of course possible, as will now be readily apparent to those of ordinary skill in the art.

Figure 1:
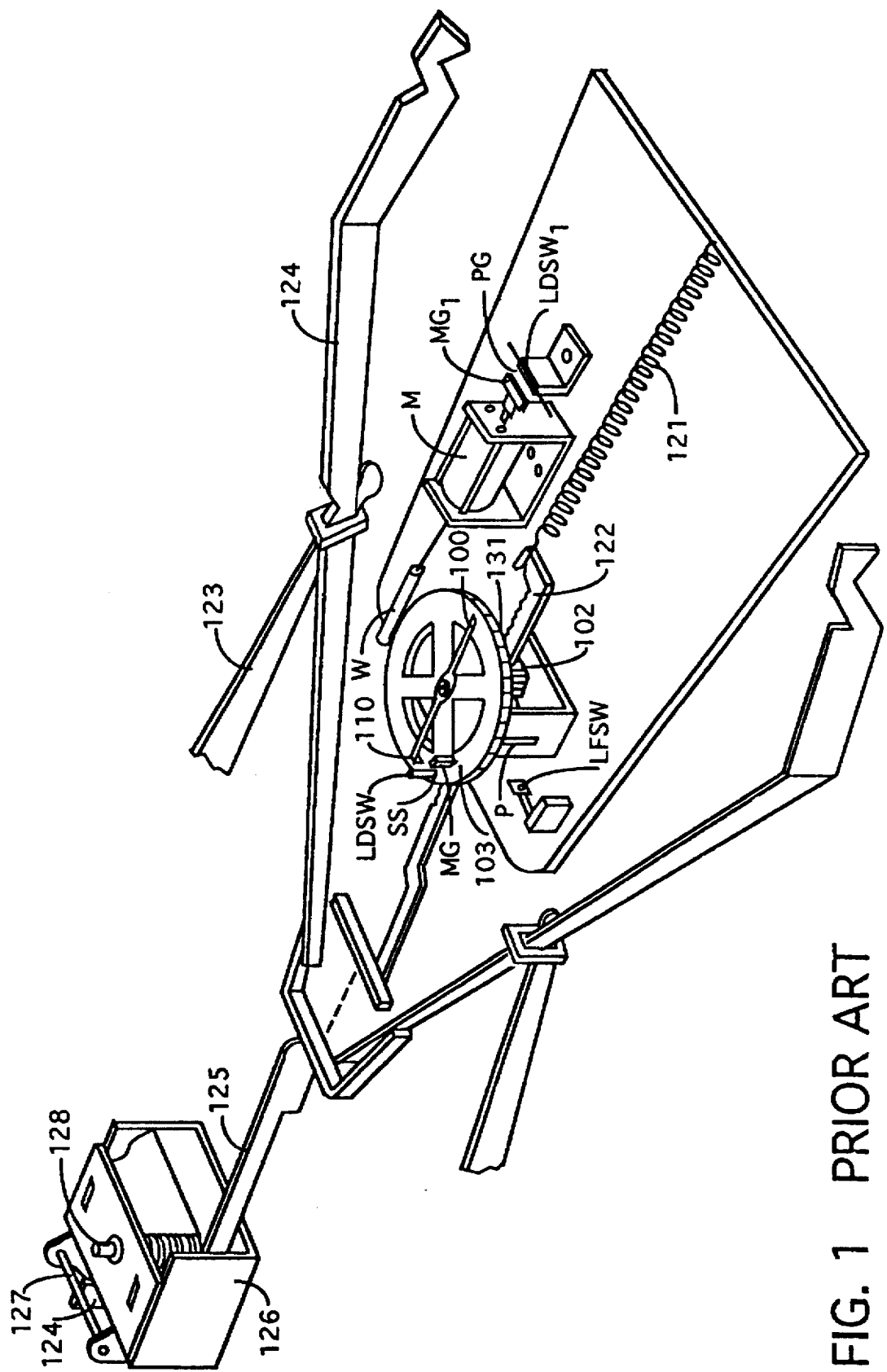
FIG. 1 is an exploded isometric view of a scale according to the prior art.

The needle 20 preferably further includes a reinforcing ring 32 which assists in reinforcing the needle 20 and in facilitating the otherwise cumbersome fabrication of the dial and needle assembly. The needle 20 preferably rides on a pin or other axle (not shown) having a pinion driven by a rack 34 (FIG. 2), known to those of ordinary skill in the art, as illustrated in FIG. 1.

Figure 4:
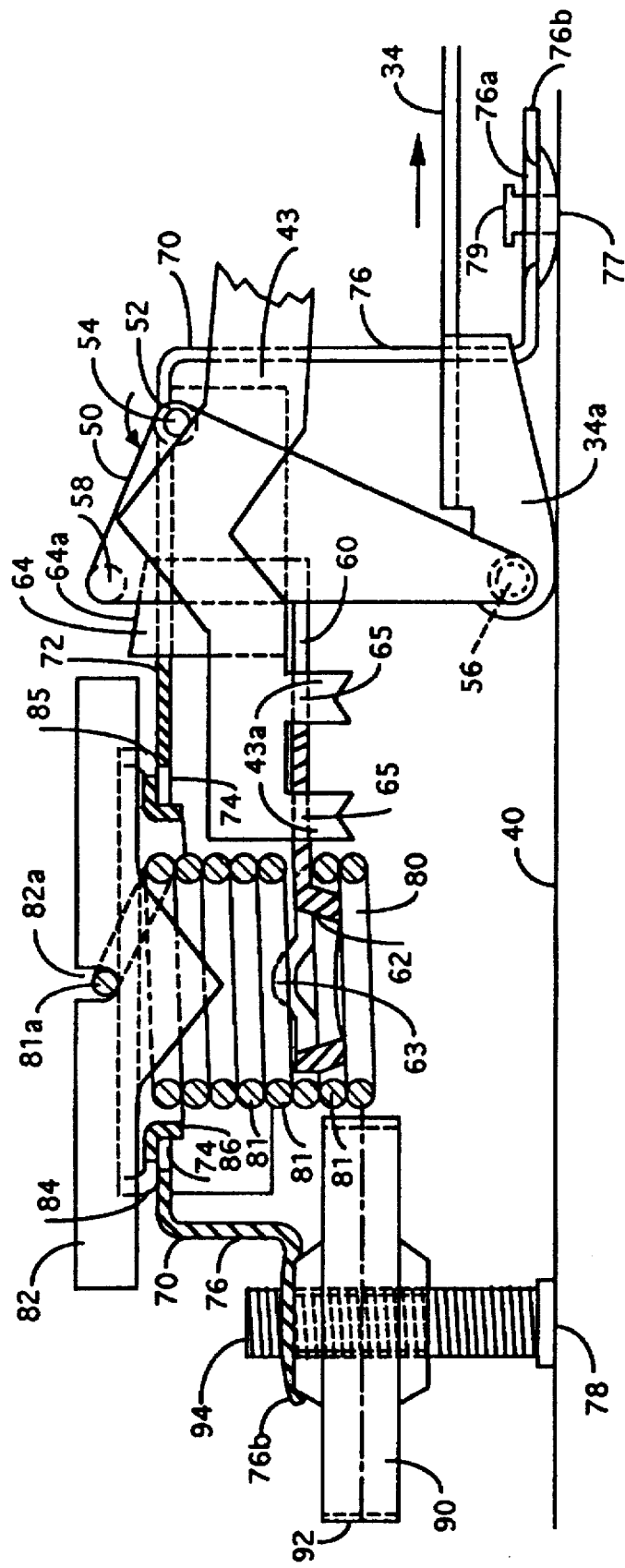
FIG. 4 is a partial cross-sectional view of a preferred vertically supported mainspring of the present invention, taken generally along the center line CL of FIG. 2.

In a most highly preferred embodiment of the invention, the weighing apparatus 10 comprises a base, generally 40, supporting a balancing link mechanism, generally 42, which may be conventional. The balancing link mechanism 42 includes two primary levers 43, each coupled to a secondary lever 44 by a hanger 45. The primary and secondary levers 43 and 44 are supported above the base 40 by vertical supports The balancing link 42 is operatively engaged with a rocker 50 as will subsequently be described. The rocker 50, also known as a "bell crank," is best illustrated in FIGS. 3a–d. The rocker 50 includes an upper pivot 52 which includes pivot pins 54 which are supported by and rotate in a channel 60. The channel 60 includes a pair of vertical walls 61, each of which includes a hole for receiving one of the pivot pins 54 of the rocker 50. As illustrated in FIG. 4, the rocker 50 also includes a lower pivot 56 which is pivotally connected to the rack 34. The rocker 50 includes a free end 58 which assists in operatively connecting the rack 34 to the mainspring and balancing link as will subsequently be described.

The invention comprises a bracket, generally 70, having a horizontal member 72. The horizontal member 72 has an opening 74 therethrough for receiving a mainspring 80. As best seen in FIG. 4, the mainspring 80 hangs vertically through the opening 74 of the bracket 70. This is accomplished by a hanger comprising a horizontal beam 82, which traverses the opening 74 of the bracket 70. Preferably, the bracket opening 74 is circular. In a highly preferred embodiment of the invention, the horizontal beam 82 is slideably received and supported by a ring 84, which has a lower flange 86 extending into the bracket opening 74. The ring 84 and lower flange 86 are sized to allow horizontal and preferably rotational movement of the ring 84 within the bracket opening 74. Preferably, the ring 84 and the lower flange 86 are both circular and the lower flange 86 comprises a collar having a diameter smaller than the diameter of the opening 74, allowing the ring 74 to nest within the opening 74 of the bracket 70.

Referring again to FIGS. 2 and 4, the bracket 70 preferably has at least two spaced-apart legs 76 that support the horizontal member 72 of the bracket 70. Each leg 76 is attached to the base 40 at a mounting point 77. This is preferably accomplished by pins or rivets 79 that are sized to be smaller than the hole 76a in the foot 76b of the leg 76 through which they pass, and are only partially inserted, allowing both vertical and horizontal "play" of the legs 76. The foot 76b of each leg is preferably a horizontal member as illustrated in FIG. 4.

Figure 7:
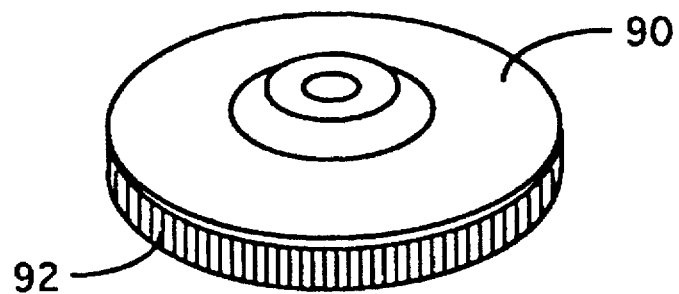
FIG. 7 is an isometric view of a zero adjusting wheel of the present invention.

As seen in FIGS. 2 and 4, in a highly preferred embodiment of the invention, the bracket 70 is supported at three points, one point 78 being along the center line CL of the rack 34 (and the scale 10) and the other two points 77 straddling the center line of the rack 34 (and the scale 10). As seen in FIG. 4, the point 78 may double as an adjustment mechanism for providing "zero" adjustment capability to the scale 10. This adjustment mechanism may comprise an adjusting wheel 90 having a knurled surface 92, best seen in FIG. 7, and threadably mounted on a vertical screw 94.

Returning to FIG. 4, the balancing link mechanism is operatively engaged with the mainspring 80 through use of a noseplate 60, which receives two lugs 43a of the primary lever 43. The lugs 43a pass through holes 65 in the noseplate 60 and are secured thereto using known means.

Figure 8A:
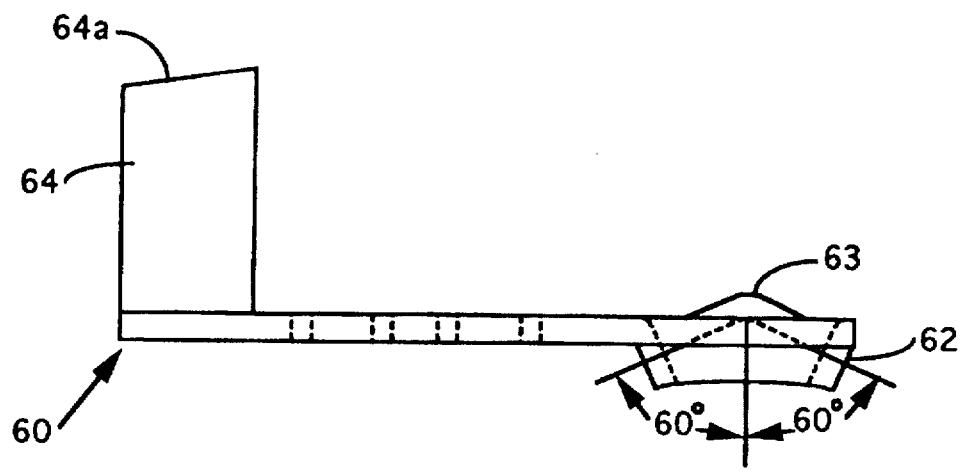
FIG. 8a is an an elevation view of a preferred noseplate of the present invention.
Figure 8B:
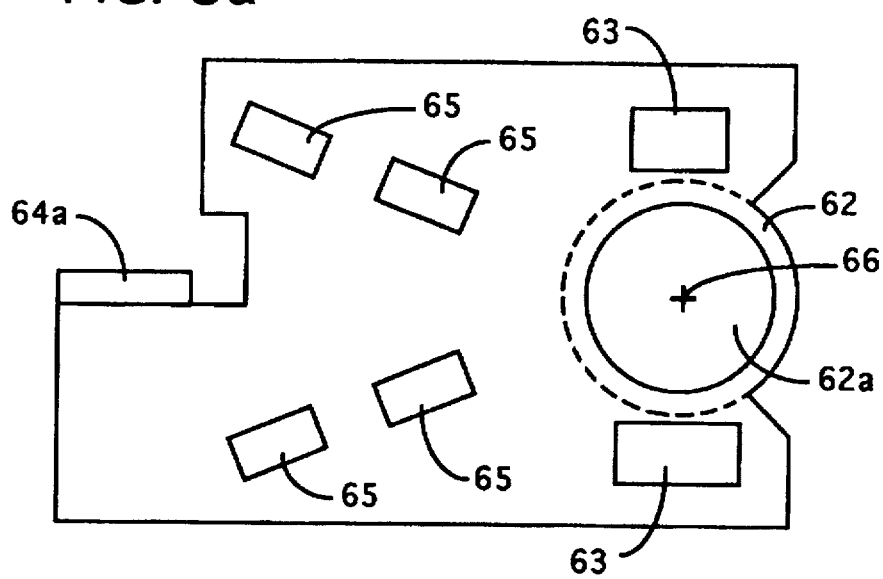
Figure 8C:
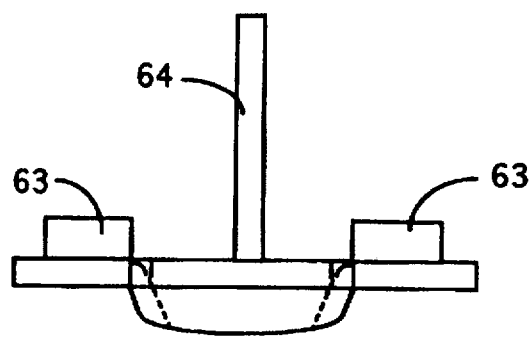

As further illustrated in FIGS. 4 and 8a–8c, the noseplate 60 includes a conical region 62 having an opening 62a. The conical region 62 nests inside one or more coils 81 of the mainspring 80. The noseplate 60 further includes a pair of flanges 63 which cooperate with the conical section 62 to capture the mainspring 80 on the noseplate 60. As best seen in FIG. 8b, the openings 65 and the inclined surface 64a of the vertical flange 64 all triangulate with the center 66 of the opening 62a in the conical region 62. The angle of incline of the inclined surface 64 is preferably on the order of about 6°.

In operation, as a weight is applied to the mat 12 of the scale 10, the balancing link mechanism is deflected downwardly, such that the primary link 43 deflects downwardly, causing the noseplate 60 to displace downwardly, which displacement is controlled by the mainspring 80 and is proportional to the weight applied to the scale 10. The noseplate 60 further includes a vertical flange 64 having an inclined upper edge 64a. The free end of the rocker 50, comprising a pin 58 rests on this inclined edge 64a as illustrated in FIG. 4. As the noseplate 60 displaces downwardly, the inclined edge 64a of the vertical flange 64 displaces downwardly, causing the free end 58 of the rocker 50 to rotate in a counterclockwise direction (FIG. 4) about the upper pivot 52, driving the lower pivot 56 and rack 34 to the right, that is, toward the front of the scale 10. The upper pivot 52 allows the rocker 50 to be pivotally connected to the base 40 of the scale 10 by virtue of the channel 60, which includes a pair of vertical flanges having holes through which the pins 54 pass. The lower pivot 56 is pivotally connected to a link 34a on the rocker 34 as illustrated.

Referring now to FIGS. 4 and 5, the ring 84, which is preferably circular, but need not be, includes a lower flange 86 as previously described, which allows the ring 84 to nest within the opening 74 in the bracket 70. The circular ring 84 preferably includes a pair of slots 85 for supporting and slideably receiving the horizontal beam 82. The circular ring 84 further includes a horizontal collar 87 which allows the ring 84 to rest on the horizontal member 72 of the bracket 70. The slots 85 are formed in the horizontal collar 87 and an upper vertical flange 88 as illustrated.

Figure 6:
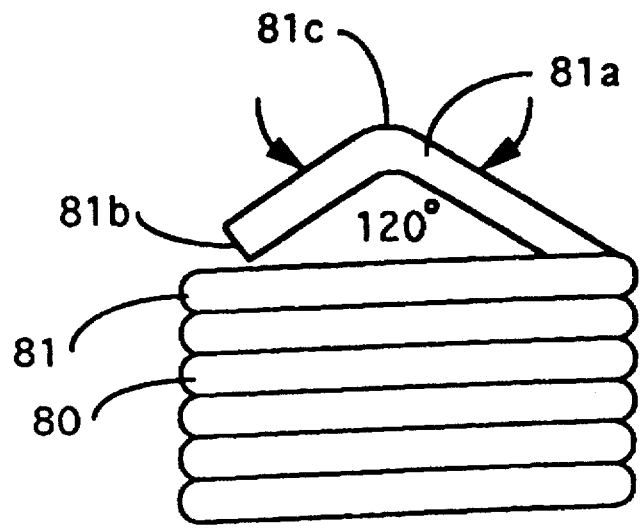
FIG. 6 is an elevational view of a preferred mainspring of the present invention.

As best seen in FIGS. 4 and 6, the mainspring 80 hangs from the horizontal beam 82 by virtue of a hooked or bent portion 81a of the uppermost coil 81 of the mainspring 80. As seen in FIG. 6, the hooked portion 81a includes an end point 81b, which should not touch the uppermost coil 81. The clearance between the end 81b and the uppermost coil 81 should not, however, exceed the diameter of the wire used in forming the mainspring 80. The hooked portion 81a preferably has a peak 81c formed at an angle of approximately 120° as illustrated. The mainspring 80 of the embodiment illustrated in FIGS. 4 and 6 is an expansion-type spring. It would be possible, however, to advantageously use a compression-type spring with the invention, for example, by flipping the bracket 70 over, and seating the compression spring 80 on the base 40.

The vertically suspended mainspring of the present invention provides significant advantages relative to the prior art. The spaced-apart legs 76 of the bracket 70 provide a wider, more stable base for supporting the vertically hung spring 80 than the prior art single pin 128 illustrated in FIG. 1. The horizontal beam 82 and ring 84 still provide some "play" to the internal mechanisms of the scale 10, yet allow the mainspring 80 to be hung vertically in a manner that provides greater stability than the prior art vertical pin.

One of the goals in any scale having a mainspring is to allow the spring, when vertically supported, to find "true center", whereby the spring and forces acting upon it are as close to vertical as possible. Because of manufacturing tolerances and variations in components, errors in dimension on the order of several thousandths of an inch are not uncommon in the components used in manufacturing scales. These errors become compounded as more and more mechanisms are put together in cooperation with each other. For this reason, most floor scales design a certain amount of "play" into the mechanical aspects of the weighing mechanism, in an effort to allow the mainspring to find "true center." If the mainspring is not at true center, then the expansion which it experiences by virtue of the applied weight does not conform to the spring's coefficient of expansion, or inherent linearity, which allows the spring's expansion (or contraction) to be proportional to the applied weight. Thus, in order to maintain a spring's deflection proportional to load, it is important to maintain the spring at true center.

The improved suspension system of the present invention, by eliminating the vertical post, and its tendency to lean, and replacing it with a bracket having a wide base supported at three points, provides a mainspring which is much more likely to maintain "true center" when a weight is applied. The zero adjustment knob 90 acts as one of the three points of support for the bracket 70, contacting the bracket 70 and raising and lowering same, thereby providing for greater "return to zero" stability.

In a preferred method of fabricating a scale of the present invention, the bracket 70, also known as a "zero bracket" is placed over the mainspring 80 which has already been positioned on the noseplate 60. The ring 84 is then dropped over the mainspring 80, and the horizontal beam 82 is inserted from the side of the ring, oriented with its wide side horizontally. The beam 82 is then placed under the hooked portion 81a of the mainspring 80 and the slot 82a in the beam 82 is aligned with the hooked portion 81a of the spring 80. The beam 82 is then turned vertically (as illustrated in FIG. 4), such that the slot 82a captures the hooked portion 81a of the mainspring 80, and the ends of the beam 82 are captured by the slots 85 in the ring 84. The bracket 70 is then ready for installation on the base 40 of the scale. The bracket 70 is loosely mounted to the base 40, such that the bracket 70 can slide horizontally and/or vertically with respect to the mounting points 77 and 78 of the base 40. Particularly when the bracket 70 has three legs 76 as illustrated, the degree of "play" provided as a result of the loose mounting of the bracket 70 to the base 40 is not critical, since the three points of contact 77 and 78 define a horizontal plane on the base 40 with which the bracket 70 is always in contact by virtue of the three legs 76.

Although the present invention has been described herein with reference to scales, such as bathroom floor scales, it will now be appreciated that the present invention could likewise be employed with other gauges, including by way of example but not limitation, pressure regulators and monitors, temperature indicators, humidity indicators, and any other type of gauge having a vertically suspended mainspring.

Although the invention has been described in detail in the foregoing for the purpose of illustration, it is to be understood that such detail is solely for that purpose and that variations can be made therein by those of ordinary skill in the art without departing from the spirit and scope of the invention as defined by the claims. It is specifically intended that any such variations are intended to be embraced by the following claims and all equivalents thereof.

I claim:

1. In a weighing apparatus comprising a base, said base supporting balancing link means, said balancing link means being operatively engaged with rocker means, whereby vertical deflection of said balancing link means from a weight applied thereto is translated into horizontal motion of said rocker means, said rocker means being coupled to rack means driving pinion means, said pinion means including indicator means for indicating a measure of said weight applied to said balancing link, the improvement comprising main spring means suspended vertically from bracket means, said bracket means being supported by said base at two or more points, said bracket means including an opening through which said main spring means may pass, said main spring means being vertically suspended on said bracket means by hanger means traversing said opening and supported by said bracket means, said main spring means including means for operatively engaging said main spring means, whereby said balancing link means deflect proportionally to said weight applied to said balancing link means.

2. The weighing apparatus of claim 1 wherein said hanger means comprises a horizontal beam supported by said bracket means.

3. The weighing apparatus of claim 2 wherein said hanger means further comprises a ring nested within the opening of said bracket means, said ring including means for supporting said horizontal beam.

4. The weighing apparatus of claim 1 wherein said bracket means is supported by said base at three points, one point being along the center line of said rack, the other two points straddling said center line.

5. The weighing apparatus of claim 4 wherein said bracket means further includes zero adjustment means comprising a shaft supporting an adjustment wheel, said adjustment means comprising said point of support for said bracket means along the center line of said rack.

6. The weighing apparatus of claim 1 wherein said means for operatively engaging said main spring means with said balancing link means comprises a noseplate with means for receiving said main spring means, said noseplate being fastened to said balancing link means and including a vertical flange having an inclined upper edge, said inclined upper edge supporting a free end of said rocker means, said rocker means including a first pivot supported by said base, and a second pivot pivotally connecting said rocker means to said rack means.

7. The weighing apparatus of claim 3, wherein said bracket means opening is circular and has a first diameter, and said ring is circular, said ring including a lower flange extending into said bracket means opening and having a second diameter smaller than said first diameter, whereby said ring is free to rotate and move horizontally within said bracket means opening.

8. The weighing apparatus of claim 7, wherein said ring has an upper flange having a third diameter greater than said first diameter, said upper flange resting on said bracket and including said means for supporting said horizontal beam.

9. The weighing apparatus of claim 1, further including an indicator means comprising:

(a) a semi-circular dial having an inner and outer row of indicating positions;

(b) an indicator having two ends, one end adapted to indicate a reading on said inner row of indicating positions, the other end adapted to indicate a reading on said outer row of indicating positions; and (c) a means for rotating said indicator around said dial in response to an external stimulus being measured by said weighing apparatus.

10. A weighing apparatus as recited in claim 9, wherein:

(a) the outer row of indicating positions is a different color from the inner row of indicating positions; and (b) that end of the indicator adapted to indicate a reading on the outer row of indicating positions is the same color as the outer row of indicating positions and that end of the indicator adapted to indicate a reading on the inner row of indicating positions is the same color as the inner row of indicating positions.

11. A weighing apparatus as recited in claim 10, wherein:
the outer row of said two rows of indicating positions is black and the inner row of said two rows of indicating positions is red.

12. The weighing apparatus of claim 11, wherein said apparatus comprises a floor scale.

13. The weighing apparatus of claim 9, wherein said indicator comprises a needle having a long end and a short end, said short end sized to provide readings on said inner row of indicating positions, said long end sized to provide readings on said outer row of indicating positions.

14. The indicator means of claim 13, wherein said needle short end is disposed 180° relative to said needle long end.

15. The indicator means of claim 14, further including blind means for hiding one of said long and short ends from view while the other said end of said needle indicates a reading on said dial.

16. The indicator means of claim 9, wherein each said row of indicator positions comprises a series of numbers having striations therebetween.

17. Support means for vertically supporting a main spring for a weighing apparatus, comprising a bracket having a horizontal member, the horizontal member having an opening therethrough for receiving said main spring, said support means further including a horizontal beam traversing said opening, said main spring hanging from said horizontal beam wherein said bracket opening is circular and has a first diameter, said horizontal beam being slideably received and supported by a circular ring, said circular ring having a lower flange extending into said bracket opening, said circular ring and lower flange being sized to allow horizontal and rotational movement of said circular ring within said bracket opening.

18. The support means of claim 17 wherein said lower flange is circular and has a second diameter smaller than said first diameter.

19. The support means of claim 17 wherein said circular ring includes an upper flange having a third diameter greater than said first diameter, said upper flange resting on said horizontal member.

20. The support means of claim 19 wherein said upper flange includes a pair of slots for slideably receiving each end of the horizontal beam.

21. The support means of claim 19 wherein said horizontal beam includes a slot for receiving an upper hook portion of said main spring.

22. Support means for vertically supporting a main spring for a weighing apparatus, comprising a bracket having a horizontal member, the horizontal member having an opening therethrough for receiving said main spring, said support means further including a horizontal beam traversing said opening, said main spring hanging from said horizontal beam, wherein said bracket has at least three spaced-apart legs supporting said horizontal member, one of said legs including zero adjustment means.

23. A method of manufacturing a vertical main spring suspension system for a weighing apparatus, comprising the steps of:

(a) providing a vertical main spring;

(b) providing bracket means having an opening therein sized for receiving said vertical main spring;

(c) positioning said main spring within said opening in said bracket means;

(d) providing suspension means for vertically suspending said vertical main spring from said bracket means; and (e) suspending said main spring from said suspension means, wherein said bracket means includes three support legs for supporting said bracket on the base of a weighing apparatus.

24. The method of claim 23 wherein said bracket means is loosely mounted to a base of a weighing apparatus.

25. A method of manufacturing a vertical main spring suspension system for a weighing apparatus, comprising the steps of:

(a) providing a vertical main spring;

(b) providing bracket means having an opening therein sized for receiving said vertical main spring;

(c) positioning said main spring within said opening in said bracket means;

(d) providing suspension means for vertically suspending said vertical main spring from said bracket means; and (e) suspending said main spring from said suspension means, wherein said suspension means comprises a ring having a lower flange and an upper flange having two slots therein for receiving a horizontal beam, wherein said lower flange is positioned within said bracket opening, said horizontal beam is positioned within said slots of said upper flange, and said main spring is suspended from said horizontal beam.

* * * * *